United States Patent
Haustein et al.

(10) Patent No.: US 8,935,469 B2
(45) Date of Patent: *Jan. 13, 2015

(54) AUTONOMIC RECLAMATION PROCESSING FOR TAPES

(75) Inventors: Nils Haustein, Mainz (DE); Thorsten Krause, Kisslegg (DE); Stefan Neff, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 219 days.

This patent is subject to a terminal disclaimer.

(21) Appl. No.: 13/346,525

(22) Filed: Jan. 9, 2012

(65) Prior Publication Data

US 2012/0179868 A1 Jul. 12, 2012

(30) Foreign Application Priority Data

Jan. 12, 2011 (EP) .................................... 11150682

(51) Int. Cl.
*G06F 12/00* (2006.01)
*G06F 13/00* (2006.01)
*G06F 13/28* (2006.01)
*G06F 3/06* (2006.01)
*G06F 12/02* (2006.01)

(52) U.S. Cl.
CPC .......... *G06F 12/0253* (2013.01); *G06F 3/0608* (2013.01); *G06F 3/0682* (2013.01); *G06F 3/0686* (2013.01); *G06F 3/0643* (2013.01); *G06F 3/0652* (2013.01); *G06F 2212/213* (2013.01); *G06F 3/064* (2013.01)
USPC ............... 711/111; 707/770; 711/4; 711/100; 711/103; 711/112; 711/170

(58) Field of Classification Search
CPC .................................................. G06F 12/0253
See application file for complete search history.

(56) References Cited

U.S. PATENT DOCUMENTS

| | | | | |
|---|---|---|---|---|
| 4,755,928 A | * | 7/1988 | Johnson et al. | ............ 714/38.14 |
| 5,574,881 A | * | 11/1996 | Yasuoka et al. | ................ 711/112 |
| 6,070,224 A | * | 5/2000 | LeCrone et al. | ................ 711/112 |
| 6,289,425 B1 | * | 9/2001 | Blendermann et al. | ........ 711/170 |

(Continued)

OTHER PUBLICATIONS

IBM Tivoli Storage Management Concepts, Brooks et al, May 2006, retrieved from http://www.redbooks.ibm.com/redbooks/pdfs/sg244877.pdf on Dec. 18, 2013 (556 pages).*

(Continued)

*Primary Examiner* — Yaima Rigol
*Assistant Examiner* — Daniel C Chappell
(74) *Attorney, Agent, or Firm* — Griffiths & Seaton PLLC

(57) ABSTRACT

Various embodiments for autonomic reclamation processing for tapes are provided. Instructions are received to perform reclamation processing on the formatted tape. Formatted tape is loaded into a tape drive for buffering active data during reclamation processing and consolidating all of the active data in capacity optimized manner on the same formatted tape. The formatted tape comprises metadata denoting active and inactive data blocks for files. The meta data of the formatted tape is read into a reclamation memory. The table is sorted and a starting block address is sorted. All active files ordered in the table starting at the starting block address are read into the reclamation memory. The files are written from the reclamation memory to the formatted tape from the starting block address and updating the table with new block addresses of the files. The meta data is updated with the updated table.

14 Claims, 5 Drawing Sheets

(56) References Cited

U.S. PATENT DOCUMENTS

| | | | |
|---|---|---|---|
| 6,789,161 B1* | 9/2004 | Blendermann et al. | 711/111 |
| 7,606,845 B2 | 10/2009 | Cannon et al. | |
| 7,765,369 B1 | 7/2010 | Prahlad et al. | |
| 2002/0156968 A1* | 10/2002 | Haustein | 711/111 |
| 2003/0196036 A1* | 10/2003 | Gibble et al. | 711/111 |
| 2005/0207235 A1* | 9/2005 | Blendermann et al. | 365/189.05 |
| 2005/0216788 A1* | 9/2005 | Mani-Meitav et al. | 714/6 |
| 2008/0243860 A1* | 10/2008 | Cannon et al. | 707/10 |
| 2008/0263272 A1* | 10/2008 | Blendermann et al. | 711/111 |
| 2011/0010495 A1* | 1/2011 | Haustein et al. | 711/111 |
| 2011/0122522 A1* | 5/2011 | Itagaki et al. | 360/15 |
| 2011/0320679 A1* | 12/2011 | Ashton et al. | 711/4 |
| 2012/0179868 A1 | 7/2012 | Haustein et al. | |
| 2012/0239691 A1* | 9/2012 | Jaquette | 707/770 |
| 2013/0185500 A1* | 7/2013 | Haustein et al. | 711/111 |

OTHER PUBLICATIONS

Tivoli Storage Manager for AIX Version 6.1 Administrator's Guide, copyright 2009, retrieved from http://publib.boulder.ibm.com/infocenter/tsminfo/v6/topic/com.ibm.itsm.srv.doc/b_srv_admin_guide_aix.pdf on May 22, 2014 (946 pages).*

* cited by examiner

AUTONOMIC RECLAMATION PROCESSING FOR TAPES

PRIORITY CLAIM

This application claims priority to European Patent Application No. 11150682.0, filed Jan. 12, 2011, which is hereby incorporated by reference in its entirety.

BACKGROUND OF THE INVENTION

1. Field of the Invention

The present invention relates to computers, and more specifically, to autonomic reclamation processing for tapes.

2. Description of Related Art

Prior art teaches file systems which are stored on tapes such as the linear tape file system (LTFS). A file system on tape is denoted by an index, which represents metadata of the file system structure. This metadata includes a mapping of files to block addresses on tape. This metadata is typically stored on a file system formatted tape as well.

The Linear Tape File System (LTFS) is a tape file system that works in conjunction with Linear Tape Open Generation 5 (LTO-5) tape. LTFS allows mounting a LTO-5 tape cartridge, which is loaded in a LTO-5 tape drive as a file system in a server and store data on the LTO-5 tape cartridge just like in a common file system. LTFS uses the LTO-5 capabilities to create partitions on one LTO-5 tape. One partition is used to store the file system index and the other partition is used to store the file system data. The data format in which the file system index and the file system data are written is described in the LTFS format specification. The format of the file system index written to partition 1 is based on XML. From a tape perspective LTFS is like a storage management application reading and writing date from and to tape.

A tape cannot be written in a random fashion but rather sequentially from the beginning to the end. Thus it is not possible to write data to any position on tape but only at the position where the last write operation ended. When data on a tape needs to be overwritten then the tape must be written from the beginning. Over time data, which has been written to tape, expires which causes data to become inactive. The remaining data is active.

SUMMARY OF THE DESCRIBED EMBODIMENTS

The present invention teaches a novel method and system for autonomic reclamation processing of tapes which comprises the steps of loading a formatted tape into tape drive, wherein said tape drive includes a memory for buffering active data during reclamation processing and a reclamation logic for consolidating all active data in capacity optimized manner on the same tape, wherein said formatted tape comprises metadata denoting active and inactive data blocks for files, receiving an instruction to perform reclamation processing on said formatted tape, reading said meta data of the formatted tape into the reclamation memory, using said meta data to determine the files which represent active data and the block addresses where these files are stored on said formatted tape and storing it in a table, sorting said table comprising in active files and block addresses by the block address in ascending order and determining a starting block address, reading all active files ordered in said table starting at said starting block address into said reclamation memory, writing said files from the reclamation memory to said formatted tape from said starting block address and updating said table with the new block addresses of the files, and updating said meta data with said updated table.

In a preferred embodiment the memory is internal part of said tape drive or tape cartridge or is externally accessible by said tape drive. The size of said memory is greater than the capacity of a single data band.

In a further embodiment the instruction for reclamation processing is initiated by a tape drive or a tape library or an application.

In a further embodiment the sorting step consolidates all block addresses of a single file resulting in a table in which all block addresses for active files are sorted by files.

In a further embodiment, the determining step is characterized by starting with block address denoted by first block address of the first inactive file from the beginning of the tape, and reading all said active files from said tape starting at said starting block address into said reclamation memory.

In a further embodiment the writing step covers the active data files from said reclamation memory on said tape starting either from said starting block address or from the block address where the last write finished.

In a further embodiment the reclamation logic checks the format on file system formatted tape before starting the reclamation and when the reclamation has finished. When this check indicates that the format is not correct then the reclamation processing will not start or if the check is performed at the end then the tape drive will report an error. Checking the format of an tape assures if all records on the tape are written in accordance to the tape file system format specification. When the processing of the embodiments above has completed then all active data is sequentially written from the beginning of tape and the LTFS application can reuse that tape and write new data beyond the active data. Thus the inventive system and method enables the tape drive to perform reclamation processing by arranging all active data at the beginning of the tape, which is transparent to the LTFS application. This overcomes the disadvantages mentioned above because:

1. Reclamation is not executed by the LTFS application but by the tape drive itself.
2. Only one tape drive is required.
3. The network between the storage management server and the tape drive is not utilized for reclamation processing.
4. All data sets or files will remain on the same tape as they have been before which optimizes the restore performance and saves physical tape drive resources
5. Reclamation processing can be performed at any time because it minimizes the impact to the storage management server.

This invention does not require any changes at the storage management application or the LTFS application. In particular it does not require the application to send a list of blocks containing active data and it does not require the application to retrieve a list of new blocks and adjust its own index. Thus this invention leverages the LTFS format which includes this information about active blocks on LTFS tape.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

FIG. 1 C shows a tape drive according to the prior art;

FIG. 2 B shows the inventive reclamation process based on the tape drive according to FIG. 2 A; and FIG. 2 C shows a further implementation of the inventive reclamation process as shown in FIG. 2 B.

The detailed description explains the preferred embodiments of the invention, together with advantages and features, by way of example with reference to the drawings.

DETAILED DESCRIPTION OF CERTAIN EMBODIMENTS

Figure 1A:
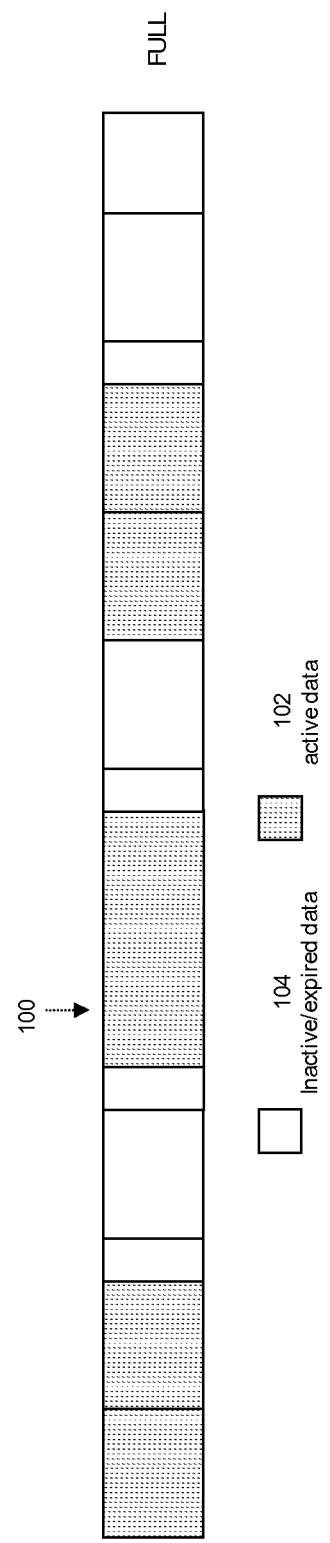
FIG. 1A shows an example for active and inactive data on tape.
Figure 1B:
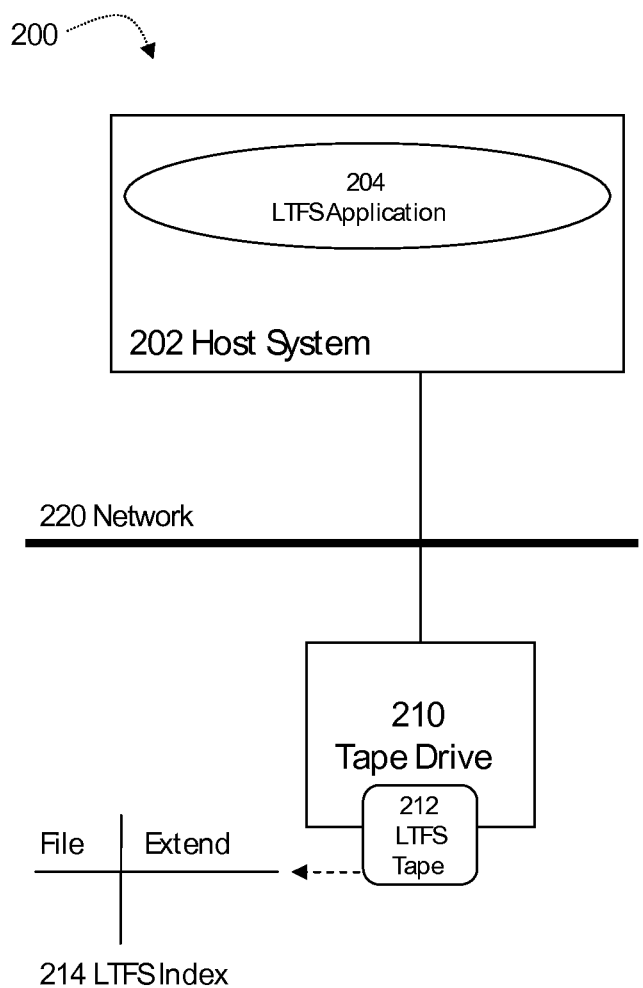
FIG. 1 B shows a LTFS system according to the prior art.
Figure 1:
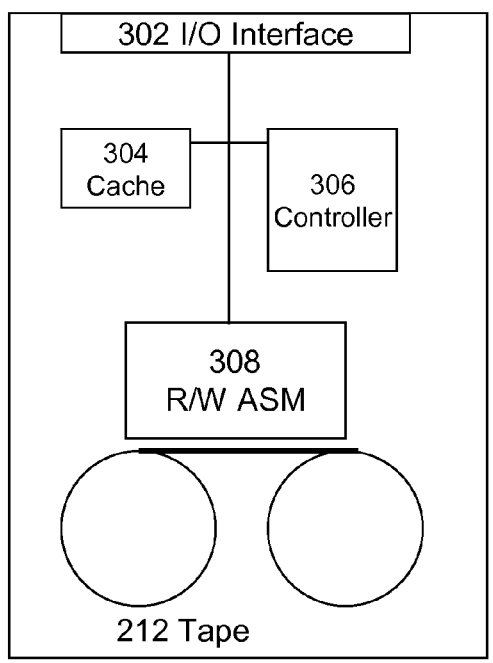

FIG. 1 A shows an example for active 102 and inactive data 104 on tape 100. When LTFS writes files to the tape it can write the file to the index partition or to the data partition. In any case LTFS only append data to either partition. Files become inactive when a new version of the file is written to the tape. The latest version of the file is active data 102, 11 prior versions are inactive data 104. The inactive files occupy storage capacity on the tape. The LTFS file system index which is written to the index partition (sometimes to the data partition in addition) includes the information about files on tape that are active and that are inactive.

As more data becomes inactive over time on a tape as more storage capacity is wasted on tape because the spots with inactive data 104 cannot be overwritten selectively. For example tape cartridges according to prior art such as Linear Tape Open Generation 5 (LTO-5) has a capacity of 1.5 TB. If such tape has 50% active data then 750 GB of storage capacity is wasted. A tape can only be reused when all active data has expired or when all active data has been moved to another medium.

Moving the active data 102 to another medium is also called reclamation. Storage management applications including such which write the LTFS format on tape implement the reclamation process. The reclamation process monitors the amount of active data on each tape which has been written full. Typically there is a threshold the user can set—also called the reclamation threshold—and if the amount of active data falls below that threshold the storage management software automatically copies the active data from that tape to another tape.

FIG. 1 B shows a LTFS system according to the prior art. The LTFS application 204 runs on a host computer system 202 which is connected via network 220 to prior art tape drive 210(FIG. 1 C). Network 220 might be a Storage Area Network (SAN) based on fibre channel or it might be a Local Area network based on Ethernet. LTFS application 204 reads and writes data according to the LTFS format specification to the tape 212 loaded in the tape drive 210 via network 220. The LTFS format includes a file system index 214. An Index is an XML data structure that describes all data files, directory information and associated meta-data for files recorded on the LTFS Volume. The location of a file written on LTFS tape 210 is denoted by an extent. Every extent element describes the location where a file extent is recorded in the LTFS tape. Every extent element must contain one partition element, one startblock element, one byteoffset element, and one bytecount element. The partition element contains the Partition ID corresponding to the LTFS partition in which the Data Extent is recorded. The startblock element specifies the first logical block number, within the partition, in which the Data Extent is recorded. The byteoffset element specifies the offset into the start block within the Data Extent at which the valid data for the extent is recorded. The bytecount element shall specify the number of bytes that comprise the extent.

FIG. 1 C shows a tape drive according to the prior art. Tape drive 210 has an I/O interface 302, which is connected to network 220. Tape drive 210 obtains commands such as SCSI command sent via fibre channel (SAN) or iSCSI (LAN) from the storage management application 204 (FIG. 1 B). Tape drive 210 further includes a cache memory 304, which is used to buffer data written by the storage management application via interface 302. Tape controller 306 manages all tape operations and the protocol on interface 302. The read/write assembly performs read and write operations on tape cartridge 212, which must be loaded in tape drive 210. For example when the storage management application 204 (FIG. 1 B) sends a write command the tape controller 306 instructs the storage management application to send the data and buffers the data in cache memory 304. When all data has been sent by the application or cache memory 304 is filled up the tape controller instructs the read/write assembly 308 to write the data to tape cartridge 212. Likewise, when the storage management application sends a read command including a block address from where the data is to be read the controller 306 receives this read command and instructs the read/write assembly 308 to position the tape at the requested block addresses. Subsequently it instructs the read/write assembly to read the requested data and transfers the data via the I/O interface 302 to the storage management application. Depending on the amount of data to be read some data might be buffered in cache memory 304.

Tapes 212 are generally recorded in a sequential manner. When data has been written to tape in this manner the tape drive typically places a end-of-data mark at the end of the last written block. The end-of-data mark typically instructs the tape drive that there is no more data to read. However the tape drive logic embedded in controller 306 also has the capabilities to read past the end of data mark. This capability is typically hidden, but it can be enabled in the logic of the tape drive controller.

The reclamation process is executed by the storage management application (such as the LTFS software), which consumes additional computing resources on the storage management server. Furthermore, the reclamation process requires two devices: one to read the data from and one to write the data to. During reclamation the network between the storage management server and the tape device is utilized. Data sets or files, which might belong together, might be written to two distinct tapes during reclamation in case one output tape gets full. This causes longer restore times and utilizes more physical drive resources because two tapes must be mounted in two drives.

In order to keep the impact of the above two reasons low the recommendation is typically to start the reclamation process when 30% or less active data resides on a sequential medium. This however causes a massive decrease in usable storage capacity—theoretically 70% in practice usually 50%.

Figure 2:
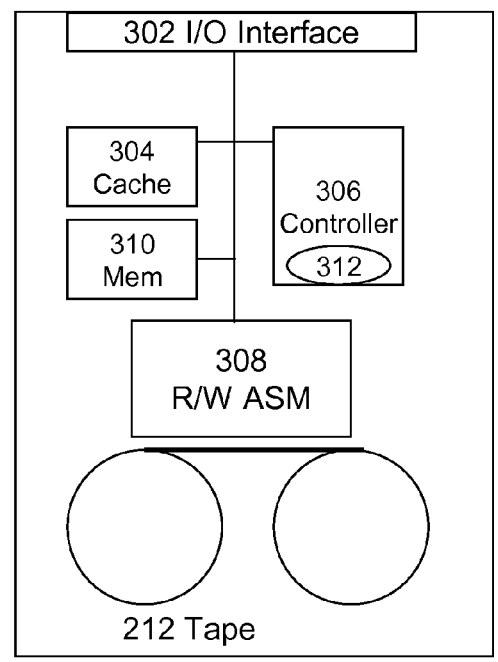
FIG. 2 A shows tape drive according to the invention.
Figure 2:
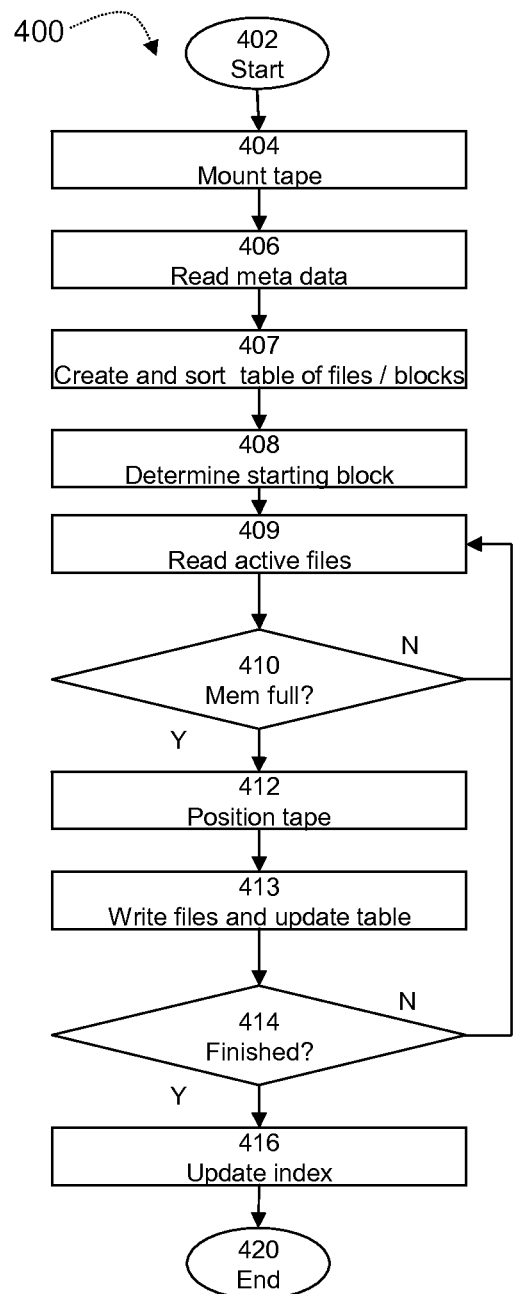
Figure 2:
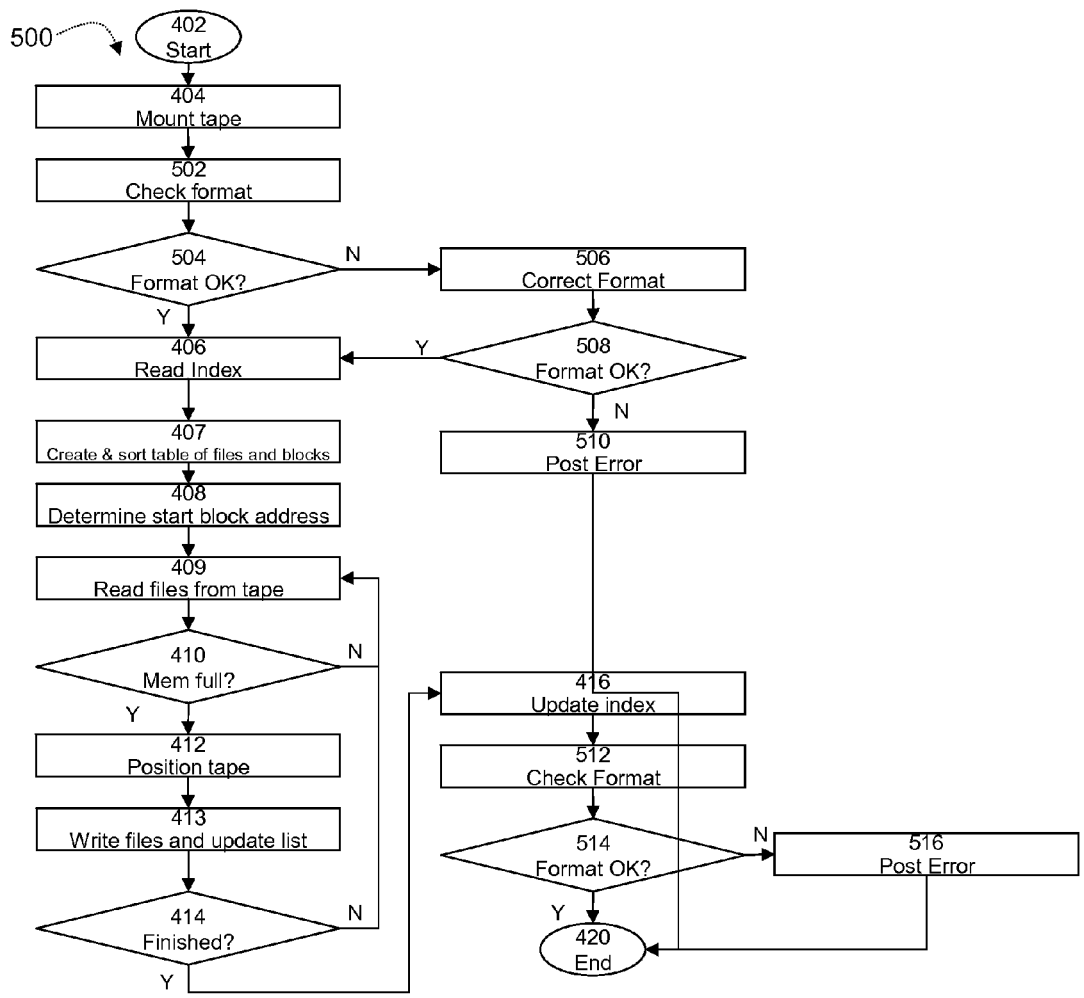

FIG. 2 A shows the novel tape drive 300 according to this invention. The novel tape drive 300 (FIG. 2 A) extends the architecture of prior art tape drive 210 (FIG. 1 C) by adding a reclamation memory 310 and a reclamation logic 312. Reclamation logic 312 is used to perform the reclamation process 400. In addition the tape drive logic in controller 306 has the capability to read beyond end-of-data mark when instructed by the reclamation logic.

The reclamation memory 310 is used to buffer the active data, which is being reclaimed. The reclamation memory might be represented by a solid state drive (SSD), by a non-volatile RAM or by a hard disk drive. The storage capacity of the reclamation memory 310 shall be at least 10% of the tape cartridge 212 capacity. When the tape technology performs shingeling then the reclamation memory capacity must be higher than the capacity of a data band. This is because with shingeling data tracks within one data band are partially overwritten which does not allow to write in place within a data band. In order to prevent overwriting active data which has not been reclaimed within a data band the reclamation memory must be large enough to store all active data written to one data band. For example the LTO-5 tape has 5 data bands, so the capacity of a data band is ⅕th of the total capacity of a LTO-5 tape which in this case is 1.5 TB/5=300 GB.

In an alternate embodiment of this invention reclamation memory 310 and cache memory 304 can be the same memory which reduces the amount of changes to prior art tape drive.

The reclamation memory might be installed internally of the tape drive 300 (FIG. 2 A), or it might be installed in the tape cartridge 212 (FIG. 2 A) or it might be installed in a network 220 (FIG. 1 B) which is attached to the tape drive 210 (FIG. 1 B) or 300 (FIG. 2 A).

FIG. 2 B/C outlines the inventive reclamation process 400 which is executed by the reclamation logic 312 (FIG. 2 A) in conjunction with the reclamation memory 310 of novel tape drive 300 and a file system formatted tape 212. A file system formatted tape includes file system metadata stored on the tape which denotes active and inactive files and data blocks. The linear tape file system (LTFS) is an example of the file system formatted tape whereby the file system metadata is also referred to as LTFS index 214 (FIG. 1 B). Process 400 (FIG. 2 B) uses LTFS as an example.

Process 400 starts in step 402 and continues to step 404 where the LTFS tape 212 (FIG. 2 A) subject for reclamation is mounted in the tape drive 300 (FIG. 2A). In step 406 the reclamation logic 312 (FIG. 2 A) of the novel tape drive 300 reads the LTFS index 214 (FIG. 1 B) of the LTFS tape 212. The index according to the LTFS format is based on an XML schema and further described in the LTFS format specification.

In step 407 the reclamation logic identifies the active files from the index 214 and also the block addresses on tape where these files are located, and stores this file to block address mapping in a table. This information can be extracted from the extent construct of the LTFS index. This table is now sorted by files and block addresses in ascending order.

In step 408 the reclamation logic determines the starting block address from the sorted table. The starting block address is the first block including inactive data from the beginning of tape. Thus the starting block address for reclamation is past the first set of consecutive active data files from the beginning of tape.

In step 409 the reclamation logic reads the active files from the starting block address according to the table and stores the files in the reclamation memory 310.

In step 410 the reclamation logic checks if memory 310 is full. If the answer in step 410 is no the process continues with step 409 and reads more files from tape into the reclamation memory. If the answer in step 410 is yes the process continues to step 412.

In step 412 the reclamation logic positions the tape on the proper block address for writing. If this is the first write pass the tape is positioned at the starting block address determined in step 408, otherwise the tape is positioned where the last write operation has ended.

In step 413 the content of the memory 310 is written to tape in a sequential manner. In this step the reclamation logic writes the active files, which have been read from tape to the reclamation memory before. When the files are written to tape the block addresses of the files will change. Therefore the reclamation logic will update the table of files with the new block addresses.

In step 414 the reclamation logic checks if all files identified in step 407 have been processed. If the answer is no the process returns to step 409 reading more active files to the reclamation memory. This requires reading beyond the end of data mark which is generated by the recent write process. If the answer is yes in step 414 and all active files has been consolidated at the beginning of tape the process continues to step 416. In step 416 the reclamation logic updates the index of the LTFS file system with the new block addresses which have been identified during writing the files to tape in step 413. In step 420 the process ends.

The reclamation process 400 (FIG. 2 B) can be initiated from the tape drive 300 (FIG. 2 A) itself, whereby the reclamation logic 312 of the tape drive determines that the amount of inactive data exceeds a certain limit in step 404 (FIG. 2 A). This determination is based on the file system metadata (LTFS index 214 in FIG. 1 B), which includes active and inactive data information.

The reclamation process 400 can also be initiated from an external application such as the LTFS application 204 (FIG. 1 B) whereby the application mounts the tape 212 and sends the tape drive 300 (FIG. 2 A) a command to perform reclamation.

The sorting of the table mapping active files to block addresses in step 407 (FIG. 2 B) can be extended to consolidate extends of files which are not located in adjacent data block addresses. This way all data blocks representing one file are consolidated in order to write them adjacent to each other on tape.

In an extended embodiment the reclamation logic implements additional format checks according to the LTFS format specification. Thereby the reclamation process 400 (FIG. 2 B is extended to reclamation process 500) which is shown in FIG. 2 C.

The extended reclamation process introduced additional steps between step 404 and 406 (FIG. 2 B). In step 502 the reclamation logic checks the LTFS format on tape. In step 504 the reclamation logic determines if the format is correct. If the answer in step 504 is yes, the process continues to step 406 just like in process 400. Otherwise if the format is not correct the process flows to step 506 in which the reclamation logic attempts to correct the format. In step 508 the reclamation logic checks if the format correction corrected the format. If the answer in step 508 is yes then the process flows to step 406 where the normal processing continues as described in FIG. 2 B. Otherwise if the answer in step 508 is no and the format cannot be corrected then the process posts an error in step 510. The error might be implemented by a tape alert which is known in the art. From step 510 the process flows to the end.

A similar format check can be introduced after step 416 and prior to the ending step 420 of FIG. 2 B. The format check checks the format in step 512 and determines if the format is ok in step 514 and if so the process ends normally. Otherwise the process ends with an error in step 516 which again might be implemented as tape alert according to prior art.

The inventive method for automatic reclamation can be implemented as an entirely software embodiment, or an embodiment containing both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A system for autonomic reclamation processing for tapes in a computing environment, comprising:
   a formatted tape;
   at least one tape drive in communication with the formatted tape, and
   at least one processor device in communication with the formatted tape and the at least one tape drive, wherein the processor device is adapted for:
      loading a formatted tape into at least one tape drive for buffering active data during reclamation processing and consolidating all of the active data in a capacity optimized manner on the same formatted tape, wherein the formatted tape comprises metadata denoting active and inactive data blocks for files,
      checking a format of the formatted tape according to format specifications,
      correcting the format of the formatted tape, if the format is not correct,
      receiving an instruction to perform reclamation processing on the formatted tape, if the format of the formatted tape is correct,
      reading the metadata of the formatted tape and using the metadata to determine the files which represent the active data and block addresses where the files are stored on the formatted tape and storing the active data and the block addresses in a table,
      sorting the table that includes active files and the block addresses by the block address in ascending order, and determining a starting block address,
      reading all active files ordered in the table starting at the starting block address into the reclamation memory,
      writing the files from the reclamation memory to the formatted tape from the starting block address and updating the table with new block addresses of the files, the formatted tape being the same formatted tape on which reclamation processing and the reading of the metadata were performed, and
      updating the metadata with the updated table.

2. The system of claim 1, wherein the reclamation memory is in communication with the processor device, the reclamation memory is one of externally accessible by the at least one tape drive and included in one of the at least one tape drive and the tape cartridge, and a size of the reclamation memory is greater than a capacity of a single data band.

3. The system of claim 1, wherein the instruction is initiated by one of the tape drive, the tape library, and an application.

4. The system of claim 1, wherein the processor device is further adapted for, in conjunction with the sorting, consolidating all of the block addresses of a single file resulting in the table in which all the block addresses for the active files are sorted by the files.

5. The system of claim 1, wherein the processor device is further adapted for determining the starting block address denoted by a first block address of a first inactive file from the beginning of the formatted tape.

6. The system of claim 1, wherein the processor device is further adapted for reading all of the active files from the formatted tape starting at the starting block address into the reclamation memory.

7. The system of claim 1, wherein the processor device is further adapted for writing active data files from the reclamation memory on the tape starting from one of the starting block address and the block address where a last write finished.

8. A computer program product for autonomic reclamation processing for tapes by a processor device, the computer program product comprising a non-transitory computer-readable storage medium having computer-readable program code portions stored therein, the computer-readable program code portions comprising:
   a first executable portion for loading a formatted tape into at least one tape drive for buffering active data during reclamation processing and consolidating all of the active data in a capacity optimized manner on the same formatted tape, wherein the formatted tape comprises metadata denoting active and inactive data blocks for files;
   a second executable portion checking a format of the formatted tape according to format specifications,
   a third executable portion correcting the format of the formatted tape, if the format is not correct,
   a fourth executable portion for receiving an instruction to perform reclamation processing on the formatted tape if the format of the formatted tape is correct;
   a fifth executable portion for reading the metadata of the formatted tape;
   a sixth executable portion for using the metadata to determine the files which represent the active data and block addresses where the files are stored on the formatted tape and storing the active data and the block addresses in a table;
   a seventh executable portion for sorting the table that includes active files and the block addresses by the block address in ascending order and determining a starting block address;
   an eighth executable portion for reading all active files ordered in the table starting at the starting block address into the reclamation memory;
   a ninth executable portion for writing the files from the reclamation memory to the formatted tape from the starting block address and updating the table with new block addresses of the files, the formatted tape being the same formatted tape on which reclamation processing and the reading of the metadata were performed; and
   a tenth executable portion for updating the metadata with the updated table.

9. The computer program product of claim 8, wherein the reclamation memory is one of externally accessible by the at least one tape drive and included in one of the at least one tape drive and the tape cartridge, and a size of the reclamation memory is greater than a capacity of a single data band.

10. The computer program product of claim 8, wherein the instruction is initiated by one of the tape drive, the tape library, and an application.

11. The computer program product of claim 8, further including, in conjunction with the sorting, consolidating all of the block addresses of a single file resulting in the table in which all the block addresses for the active files are sorted by the files.

12. The computer program product of claim 8, further including an eleventh executable portion for determining the starting block address denoted by a first block address of a first inactive file from the beginning of the formatted tape.

13. The computer program product of claim 8, further including an eleventh executable portion for reading all of the active files from the formatted tape starting at the starting block address into the reclamation memory.

14. The computer program product of claim 8, further including an eleventh executable portion for writing active data files from the reclamation memory on the tape starting from one of the starting block address and the block address where a last write finished.

* * * * *